(12) United States Patent
Hancock

(10) Patent No.: US 6,971,224 B1
(45) Date of Patent: Dec. 6, 2005

(54) RETRACTABLE DISCHARGE CHUTE FOR A LAWN MOWER

(75) Inventor: Frank Hancock, Jackson, GA (US)

(73) Assignee: Ariens Company, Brillion, WI (US)

( * ) Notice: Subject to any disclaimer, the term of this patent is extended or adjusted under 35 U.S.C. 154(b) by 0 days.

(21) Appl. No.: 11/027,836

(22) Filed: Dec. 30, 2004

(51) Int. Cl.[7] .............................................. A01F 34/71
(52) U.S. Cl. ...................... 56/320.2; 56/255
(58) Field of Search ..................... 56/320.1, 320.2, 56/295, 255, 202

(56) References Cited

U.S. PATENT DOCUMENTS

| | | | |
|---|---|---|---|
| 3,721,078 A | * | 3/1973 | Haffner ........................ 56/202 |
| 4,258,539 A | | 3/1981 | Pearce et al. |
| 4,726,178 A | * | 2/1988 | Mallaney et al. ............. 56/202 |
| 4,951,449 A | | 8/1990 | Thorud |
| 5,003,757 A | | 4/1991 | Hill |
| 5,040,364 A | | 8/1991 | Deegan |
| 5,195,311 A | | 3/1993 | Holland |
| 5,499,494 A | | 3/1996 | Boshell et al. |
| 5,826,417 A | | 10/1998 | Evans |
| 5,913,804 A | | 6/1999 | Benway |
| 5,992,135 A | | 11/1999 | Benway |
| 6,609,358 B1 | | 8/2003 | Schmidt et al. |
| 6,694,716 B1 | | 2/2004 | Osborne |
| 6,735,932 B2 | | 5/2004 | Osborne |
| 6,751,937 B2 | | 6/2004 | Kobayashi et al. |
| 2004/0083702 A1 | | 5/2004 | Strange et al. |
| 2004/0112031 A1 | | 6/2004 | Dickey |
| 2004/0231311 A1 | * | 11/2004 | Kallevig ..................... 56/320.2 |

FOREIGN PATENT DOCUMENTS

EP        0014383 A1 *   1/1980

* cited by examiner

*Primary Examiner*—Meredith C. Petravick
(74) *Attorney, Agent, or Firm*—Michael Best & Friedrich LLP

(57) ABSTRACT

A lawn mower that includes a cutting blade rotatable about a blade axis to produce clippings and a mower deck including a side opening positioned to allow for the discharge of the clippings. A discharge chute is coupled to the mower deck adjacent the side opening. The discharge chute includes a first plate that at least partially defines the front of the discharge chute and a second plate that at least partially defines the rear of the discharge chute. The second plate is spaced apart from and arranged at a first angle relative to the first plate. A top plate is coupled to and arranged at a second angle relative to the front plate. The first plate, the second plate, and the top plate, are movable to move the discharge chute between a first position and a second position such that the first angle and the second angle remain substantially constant.

33 Claims, 5 Drawing Sheets

RETRACTABLE DISCHARGE CHUTE FOR A LAWN MOWER

BACKGROUND

The invention relates to a lawn mower. More particularly the invention relates to a movable discharge chute for a lawn mower.

Lawn mowers are commonly used to cut grass and other vegetation around commercial as well as residential buildings. Often the clippings are discharged from the lawn mower onto the lawn. Alternatively, the clippings are mulched by the lawn mower and discharged onto the lawn.

To discharge clippings, lawn mowers often include a discharge chute disposed on one side of the lawn mower deck. The discharge chute directs the clippings out of the cutting area defined by the rotating blade. Generally, the discharge chute extends from the side of the deck. As such, the discharge chute is susceptible to impacting outside objects such as trees, bushes, rocks, landscaping, and the like.

Switching most lawn mowers from discharge operation to mulching operation generally requires the operator to remove the discharge chute and install a cover over the discharge opening. The cover traps the clippings within the mower deck and allows the blade to repeatedly cut and mulch the clippings.

SUMMARY

In one embodiment, the invention provides a lawn mower that includes a cutting blade that is rotatable about a blade axis to produce clippings, and a mower deck including a side opening positioned to allow for the discharge of the clippings. A discharge chute is coupled to the mower deck adjacent the side opening. The discharge chute includes a first plate that at least partially defines the front of the discharge chute and a second plate that at least partially defines the rear of the discharge chute. The second plate is spaced apart from and arranged at a first angle relative to the first plate. A top plate is coupled to, and arranged at a second angle relative to the front plate. The first plate, the second plate, and the top plate, are movable to move the discharge chute between a first position and a second position such that the first angle and the second angle remain substantially constant.

In another embodiment, the invention provides a lawn mower that is movable along a mower path to produce clippings. The lawn mower includes a blade supported for rotation about a blade axis, and a mower deck that includes a discharge opening and is positioned to substantially cover the blade. A bracket is coupled to the mower deck adjacent the discharge opening. The bracket is pivotable about a bracket axis that is substantially parallel to the mower path. A front plate is pivotably mounted to the bracket and a rear plate is pivotably mounted to the bracket and disposed at an angle relative to the front plate. A top plate is coupled to at least one of the front plate and the rear plate. The front plate, the rear plate, and the top plate are movable between a first position wherein clippings are discharged from the mower deck and the angle has a first value, and a second position wherein clippings are substantially retained within the mower deck and the angle is a second value that is substantially the same as the first value.

The invention also provides a discharge chute assembly for a lawn mower having a deck with a rotating cutting blade under the deck for cutting vegetation. The deck includes a discharge opening for the discharge of cut vegetation from under the deck. The discharge chute assembly includes a hinge bracket hingedly interconnected to the mower deck and defining a chute opening aligned with the discharge opening. A front plate is pivotally attached to the front of the hinge bracket and a rear plate is pivotally attached to the rear of the hinge bracket. A front top plate interconnects with the front plate and is positioned above the hinge bracket and chute opening. The front top plate includes a spring anchor point. A rear top plate is interconnected with the rear plate and is positioned above the hinge bracket and chute opening. A spring/cable bracket is disposed over the rear top plate and is pivotally interconnected with the front and rear plates. A spring interconnects between the spring/cable bracket and the spring anchor point to bias the chute assembly to a discharge position. The discharge chute assembly is movable between the discharge position in which the front plate, rear plate, front top plate, and rear top plate define a discharge chute that channels cut vegetation from under the deck, and a mulching position in which the front plate is pivoted across the chute opening to cause vegetation to remain under the mower deck and be mulched by the rotating cutting blade.

In still another embodiment, the invention provides a method of moving a discharge chute for a lawn mower from a discharge position to a mulch position. The method includes arranging a front plate, a rear plate, and a top plate around a discharge opening to at least partially define a discharge chute. The method also includes positioning a chute control adjacent an operator position, actuating the chute control, and moving the front plate into covering relationship with the discharge opening in response to movement of the chute control. The method further includes maintaining an angular relationship between the front plate, the rear plate, and the top plate during movement of the front plate.

In yet another embodiment, the invention provides a discharge chute for a lawn mower having a mower deck and a mower deck opening. The discharge chute is movable between a discharge position and a mulch position and includes a pivot plate defining an opening aligned with the mower deck opening and pivotable with respect to the deck about a first axis. A front plate is pivotable with respect to the pivot plate about a second axis and a rear plate is pivotable with respect to the pivot plate about a third axis. At least one top plate defines a top plane and is movable within said top plane when the discharge chute moves between the discharge position and the mulch position.

Other aspects and embodiments of the invention will become apparent by consideration of the detailed description and accompanying drawings.

BRIEF DESCRIPTION OF THE DRAWING

The detailed description particularly refers to the accompanying figures in which.

DETAILED DESCRIPTION

Before any embodiments of the invention are explained in detail, it is to be understood that the invention is not limited in its application to the details of construction and the arrangement of components set forth in the following description or illustrated in the following figures. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

Figure 1:
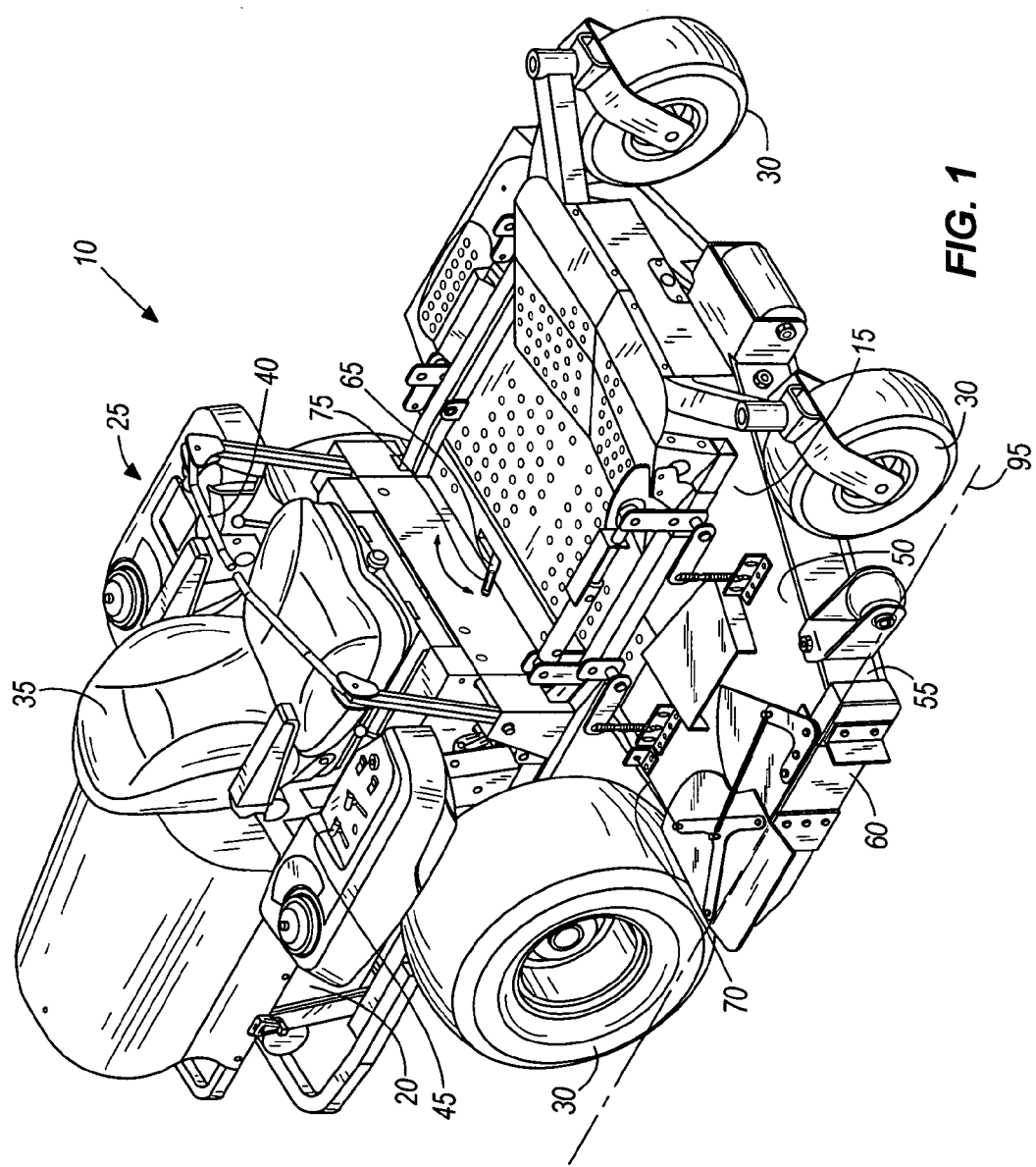
FIG. 1 is a perspective view of a lawn mower including a side discharge chute.
Figure 6:
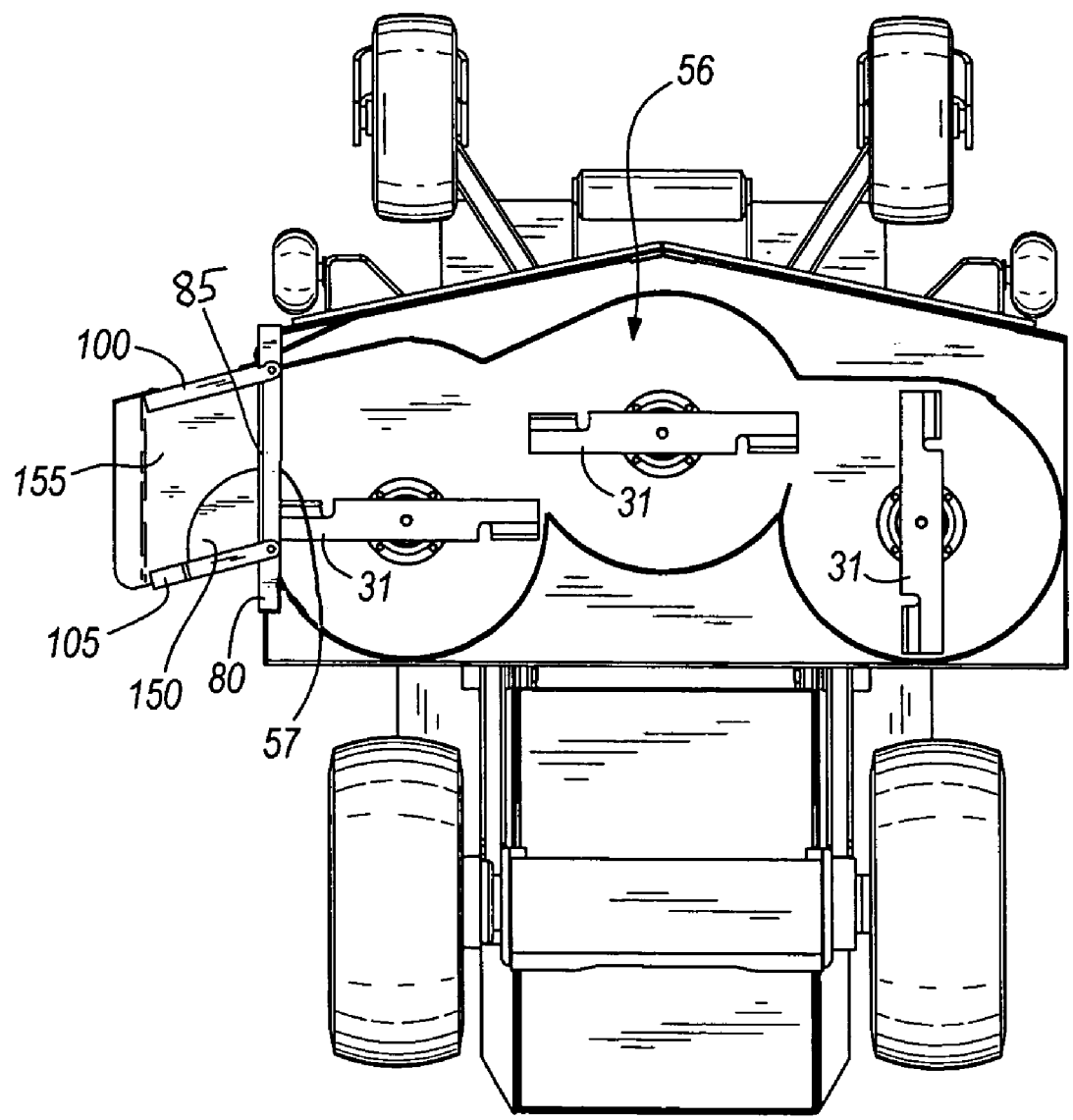
FIG. 6 is a bottom view of the lawn mower of FIG. 1.

As shown in FIG. 1, a lawn mower 10 generally includes a mower deck 15, an engine 20, an operator zone or operator station 25, and a plurality of wheels 30. The engine 20 includes an output shaft that extends toward the ground and drives the cutting blades 31 (shown in FIG. 6). Generally, the wheels 30 are driven independent of the output shaft using a hydraulic drive system. However, the drive system employed is not critical to the function of the invention. The cutting blades 31 rotate in response to engine operation to cut the vegetation disposed beneath the deck 15. As one of ordinary skill will realize, there are many different ways of connecting wheels 30 and cutting blades 31 to the output shaft (e.g., belts, chains, direct drives, gears, transmissions, and the like). The invention described herein is suited to use with most of these connection means. In addition, while the invention has been illustrated with three cutting blades 31, mowers with one blade, two blades, or more than three blades will also function with the invention.

The operator station 25 is positioned above the deck 15 to provide a good view for the operator. The operator station 25 includes a seat 35 that is positioned to allow the operator to reach the steering controls 40, the engine controls 45, and any other controls that may be used on the lawn mower 10. In this regard, the terms "operator zone" and "operator station" include the seat and all controls accessible by the operator while seated during normal operation of the lawn mower 10. It should be noted that while FIG. 1 illustrates a riding lawn mower 10, the invention described herein is also suited for use on non-riding lawn mowers. In non-riding lawn mowers, the operator station would be located behind the lawn mower and no seat would be employed.

The deck 15 includes a substantially planar surface 50 and one or more walls 55 that extend from the planar surface 50 toward the ground. The planar surface 50 and walls 55 cooperate with the ground to substantially enclose a cutting space 56 (shown in FIG. 6) in which the blades 31 rotate. The deck 15 includes a discharge opening 57 disposed in one side 55 of the deck 15. The discharge opening 57 provides a path for the cut vegetation out of the cutting space 56 under the deck 15. In some constructions, the deck 15 may include ribs, guides, channels, or other flow directing devices that aid in directing the clippings toward the discharge opening 57.

Figure 2:
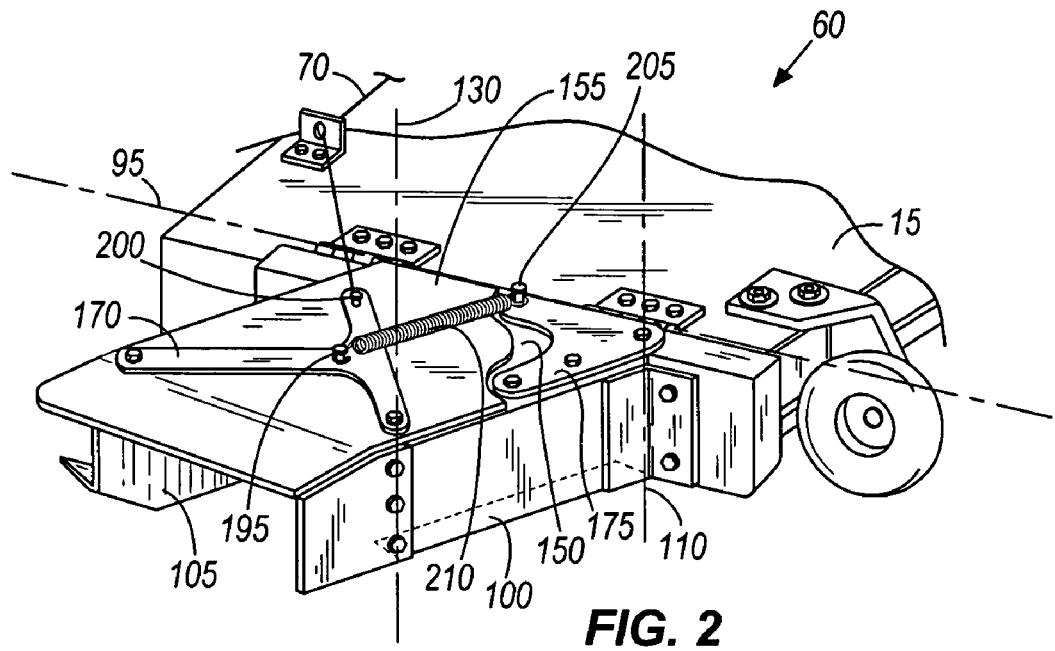
FIG. 2 is a perspective view of the side discharge chute of FIG. 1 in an open position.
Figure 3:
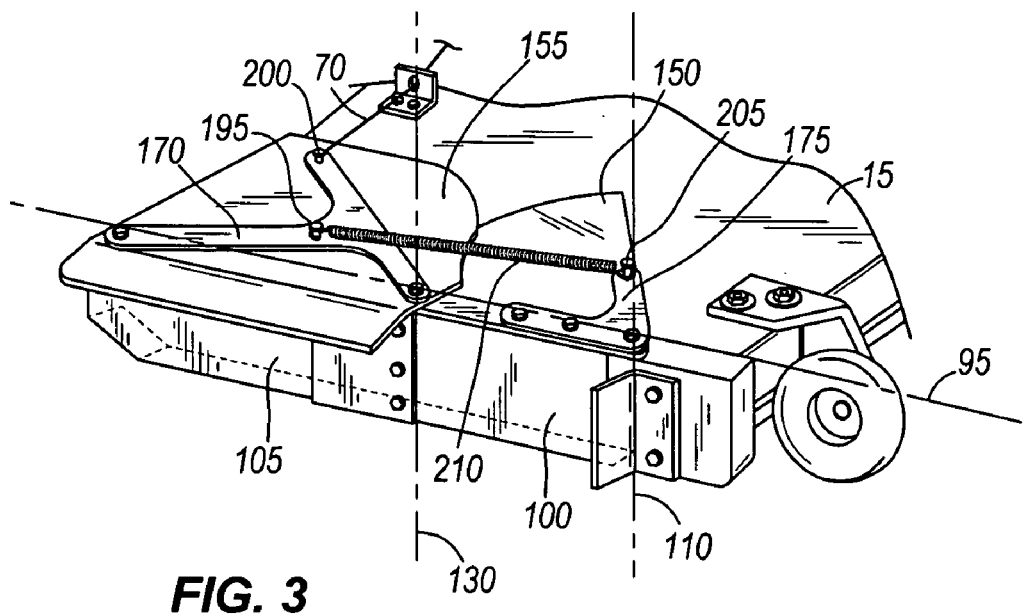
FIG. 3 is a perspective view of the side discharge chute of FIG. 1 in a closed position.

A discharge chute 60 is attached to the deck 15 and is operable to further direct the clippings away from the lawn mower 10. The discharge chute 60 is movable between a first, or open position, shown in FIG. 2, and a second, or closed position, shown in FIG. 3. When in the open position, clippings are discharged from beneath the mower deck 15 as they are cut. Thus, the open position is sometimes referred to herein as the discharge position. When the discharge chute 60 is in the closed position, clippings, as well as any other debris (e.g., small sticks, stones, and the like), are retained beneath the deck 15 and further cut, or mulched by the blades 31. Thus, the closed position is sometimes referred to herein as the mulching position.

At least a portion of a discharge chute control 65 is positioned within the operator station 25 and is operable to move the discharge chute 60 between the first position and the second position. The control includes a wire 70, such as a Bowden cable, and a lever 75. One end of the wire 70 connects to the discharge chute 60 and a second end of the wire connects to the lever 75. The lever 75 is disposed within the operator station 25 and is movable between a first position and a second position. Thus, by simply moving the lever 75 the operator can move the discharge chute 60 from the first position (shown in FIG. 2) to the second position (shown in FIG. 3) while seated, without having to dismount the lawn mower 10, and without any special equipment. This allows for quick transitions between discharge operation and mulching operation.

It should be noted that some constructions may employ an electric motor or other powered-actuator (e.g., hydraulic actuator) in place of the lever 75. A controller such as a joystick 76 (shown in FIG. 5) would be positioned within the operator station 25 to allow the operator to control the position of the discharge chute 60. More specifically, the controller would be used to operate the motor or other actuator to actuate a modified version of the discharge chute control 65 in which the powered actuator performs the function of the above-described lever 75.

Figure 4:
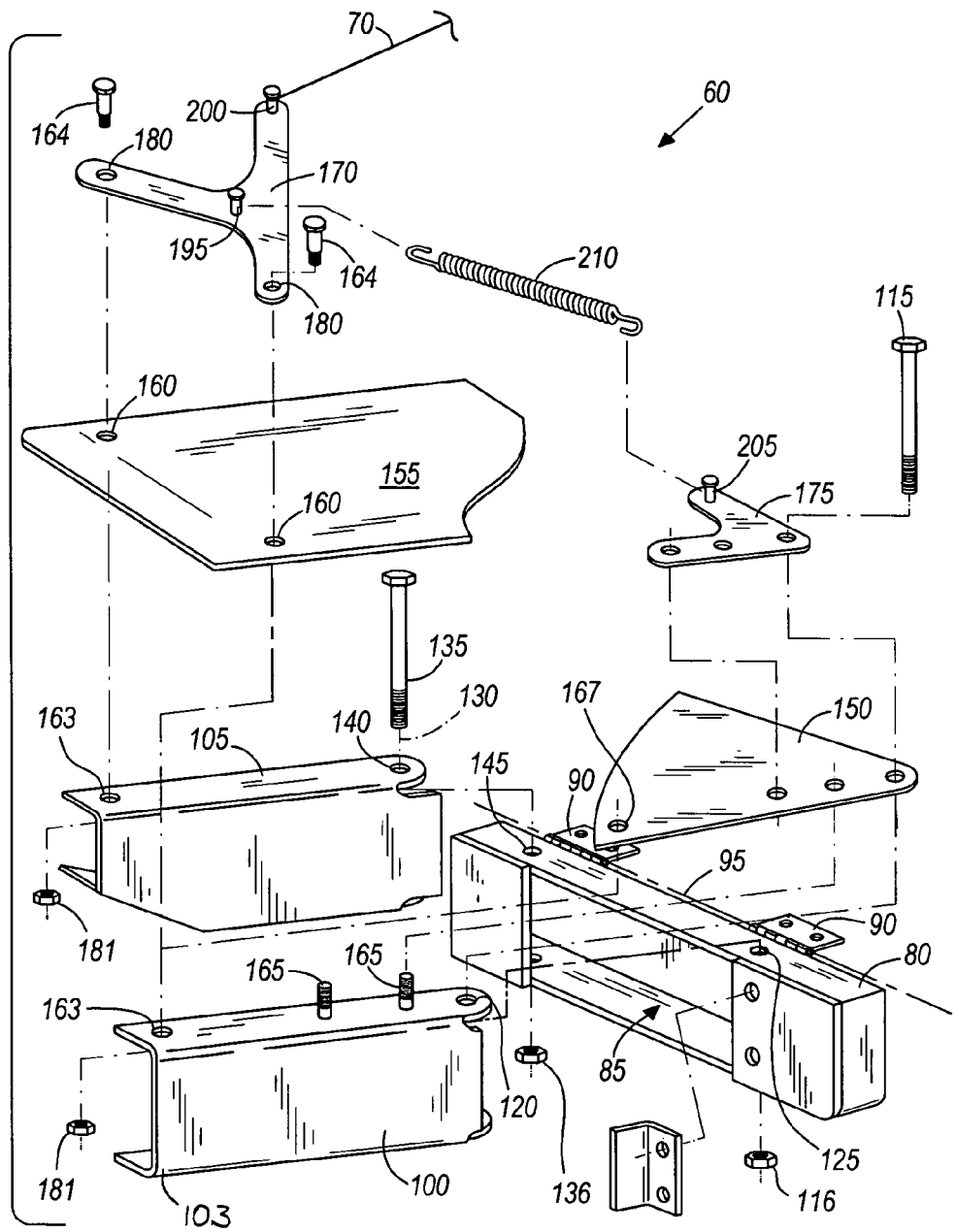
FIG. 4 is an exploded perspective view of the side discharge chute of FIG. 1.

With reference to FIG. 4, the discharge chute 60 is illustrated in an exploded condition. The discharge chute 60 includes a hinge plate 80 that attaches to the deck 15 adjacent the discharge opening 57. The hinge plate 80 includes an aperture 85 that aligns with the discharge opening 57 to facilitate the passage of clippings from under the deck 15 to the discharge chute 60. The hinge plate 80 connects to the deck 15 using one or more hinge mechanisms (e.g., the two hinges 90 illustrated in FIG. 4) that allow the hinge plate 80 to pivot relative to the deck between an up position and a down position. The hinge plate 80 pivots about a hinge axis 95 that is substantially parallel to the straight ahead direction of travel of the lawn mower 10. Of course one hinge 90, or more than two hinges 90 could be employed if desired. In addition, other constructions may employ mechanisms other than hinges 90 (e.g., slots and pins, a shaft, a living hinge, and the like) to achieve the desired motion of the hinge plate 80 relative to the deck 15. As such, the invention should not be limited to the illustrated hinges alone.

The discharge chute 60 also includes a first, or front plate 100 and a second, or rear plate 105. Before proceeding, it should be noted that the term "plate" as used herein should not be read to limit the particular item to flat structures. Rather, "plate" components could include cross-sections that include channel, angle, box, other beam shapes, or other shapes if desired, provided the components are suitable to define portions of the discharge chute 60.

The hinge plate 80 includes a front and a rear, where the front is disposed closer to the front portion of the lawn mower 10. The front plate 100 pivotally attaches to the hinge plate 80 at a front pivot axis 110 and is pivotable between a first position and a second position corresponding to the open (first) and closed (second) position of the discharge chute 60. The front and rear plates 100, 105 include curved surfaces 103 along their bottom edges that permit the plates to smoothly ride over bumps in the ground. A pin or bolt 115 passes through apertures 120 in the front plate 100 that align with apertures 125 in the hinge plate 80 to define the front pivot axis 110. A nut 116 can engage the bolt 115 to hold it in position. Alternatively, the bolt 115 engages a threaded aperture in the front plate 100. In still other constructions, a pin replaces the bolt 115 and a cotter pin or other retaining device is used to inhibit unwanted removal of the pin. The front pivot axis 110 is substantially orthogonal to the hinge axis 95, and substantially orthogonal to the planar surface 50, and parallel to the wall 55 of the mower deck 15 when the hinge plate 80 is in the down position.

When the discharge chute 60 is in the open position (FIG. 2), the front plate 100 defines a portion of the open discharge chute 60. When the discharge chute 60 is in the closed position (FIG. 3), the front plate 100 is substantially parallel to the hinge plate 80 and covers the hinge plate aperture 85. The front plate 100 is sized to substantially or totally cover the hinge plate aperture 85 when moved to the second position.

The rear plate 105 pivotally attaches to the rear of the hinge plate 80 at a rear pivot axis 130 defined by a pin or bolt 135 passing through apertures 140 in the rear plate 105 and apertures 145 in the hinge plate 80. As with the bolt 115, a nut 136 can engage the bolt 135 to hold it in position. Alternatively, the bolt 135 engages a threaded aperture in the rear plate 105. In still other constructions, a pin replaces the bolt 135 and a cotter pin or other retaining device is used to inhibit unwanted removal of the pin. The rear plate 105 is pivotable between first and second positions corresponding to open and closed discharge chute 60 positions. The rear pivot axis 95 is substantially orthogonal to the hinge axis 95 and parallel to the front pivot axis 110. When the discharge chute 60 is in the first position, the rear plate 105 defines a portion of the open discharge chute 60 and is disposed at an angle relative to the front plate 100. As the discharge chute 60 moves to the second position, the rear plate 105 maintains a substantially constant angular relationship with the front plate 100. In most constructions, it is desirable to arrange the front plate 100 and the rear plate 105 such that they are parallel to one another. Thus, when the rear plate 105 is in the second position, the rear plate 105 is substantially parallel to the front plate 100 and the discharge chute 60 is closed.

With continued reference to FIG. 4, the discharge chute 60 also includes a top portion made up of a front top plate 150 and a rear top plate 155. The rear top plate 155 includes two apertures 160 that align with apertures 163 at the distal ends (i.e., opposite the apertures 120, 140) of the front and rear plates 100, 105 and that facilitate the attachment of the rear top plate 155 to the front and rear plates 100, 105 with fasteners 164 (discussed in detail below). The rear top plate 155 may thus pivot about the fasteners 164 with respect to the front and rear plates 100, 105. Thus, the distance between the distal ends of the front and rear plates 100, 105 is fixed, and the front and rear plates 100, 105 remain free to pivot in unison such that they define a substantially constant angle therebetween. For example, if the front and rear plates 100, 105 are substantially parallel to each other, they will remain substantially parallel through the entire range of motion of the discharge chute 60.

The front top plate 150 attaches to the front plate 100 by way of a plurality of fasteners 165. The construction of FIG. 4 includes two fasteners 165, with more or less being possible. The front top plate 150 also includes an aperture 167 aligned with aperture 160 of the rear top plate 155 and aperture 163 of the front plate 100. The front top plate 150 fits below the rear top plate 155 and slides underneath the rear top plate 155 as the discharge chute 60 moves between the opened and closed positions. Of course other constructions could reverse the positions of the front top plate 150 and the rear top plate 155 such that the front top plate 150 is on top of the rear top plate 155. The front top plate 150 and the rear top plate 155 are shaped such that during movement of the discharge chute 60, they do not interfere with any other lawn mower components. To avoid interference, the actual shape of the front top plate 150 and the rear top plate 155 may be varied, depending on the particular mower to which they are attached.

In the illustrated construction, the front top plate 150 and the rear top plate 155 are manufactured using a flexible material such as rubber. An anchor bracket 170 covers a portion of the rear top plate 155 and a corner bracket 175 covers a portion of the front top plate 150. Generally, the anchor bracket 170 and the corner bracket 175 are manufactured using a stiff material such as steel, aluminum, or another structural material. The anchor bracket 170 includes two apertures 180 that substantially align with the apertures 160, 163 in the rear top plate 155 and front and rear plates 100, 105. One fastener 164 extends through apertures 180, 160, 163 to couple the bracket 170, the rear top plate 155, and the rear plate 105. A nut 181 or threads formed in the aperture 163 can be employed to secure the fastener 164. The second fastener 164 extends through apertures 180, 160, 167, 163 to couple the bracket 170, the rear top plate 155, the front top plate 150, and the front plate 100. Again, a nut 181 or threads formed in the aperture 163 can be employed to secure the fastener 164. When the discharge chute 60 moves from the first position to the second position, the rear top plate 155 and the anchor bracket 170 rotate relative to the front plate 100 and the rear plate 105. As such, fasteners 164 may take the form of shoulder bolts to fix the position of the rear top plate 155 and the anchor bracket 170 relative to the front plate 100 and the rear plate 105 without fixing the orientation. Thus, the anchor bracket 170 and the rear top plate 155 are free to rotate relative to the front and rear plates 100, 105. The corner bracket 175 and the front top plate 150 do not necessarily rotate relative to the front plate 100. As such, the fasteners 165 that attach the front top plate 150 to the front plate 100 may be employed to also attach the corner bracket 175 if desired.

The anchor bracket 170 includes a first biasing anchor point 195 and a control anchor point 200. The corner bracket 175 includes a second biasing anchor point 205. A biasing member, such as a spring 210, extends from the first biasing anchor point 195 to the second biasing anchor point 205. The spring 210 biases the discharge chute 60 toward the first, open, or discharge position, while still allowing the discharge chute 60 to move to the second, closed, or mulching position. In constructions that use stiffer materials (e.g., steel) to manufacture the front top plate 150 and the rear top plate 155, the anchor bracket 170 and the corner bracket 175 may be omitted as the front top plate 150 and the rear top plate 155 may provide adequate strength and stiffness to support the various anchor points.

The discharge chute control wire 70 connects to the discharge chute 60 at the control anchor point 200 such that movement of the control lever 75 (or actuation of a motor in power-assisted embodiments) moves the discharge chute 60 between the first position and the second position. Movement of the lever 75 in one direction pulls the wire 70, and the discharge chute 60, toward the second position. Movement of the lever 75 in the opposite direction allows the biasing member 210 to move the discharge chute 60 toward the first position and to pull the wire 70 to maintain some tension on the wire 70. In other constructions, a rigid linkage may be used in place of the wire 70 to push and pull the chute. Both rigid linkages as well as wire mechanisms, and other arrangements are considered actuating mechanisms.

In operation, the operator selects the desired position of the discharge chute 60. With the discharge chute 60 in the first position, operation of the lawn mower 10 will cut the vegetation beneath the deck 15 and discharge the clippings via the open discharge chute 60. The discharge chute provides two modes of obstacle avoidance or obstacle accommodation. In the first mode, the curved surfaces 103 of the front and rear plates 100, 105 allow the chute 60 to ride over ground contours and pivot the entire discharge chute 60 about the hinge axis 95 and pivot back to the operating position under the influence of gravity. In the second mode, the discharge chute 60 pivots about the hinge axes 110, 130 to collapse the chute 60 against the side of the deck and spring back to the operating position once the obstacle is cleared. The discharge chute 60 can accommodate obstacles in the first and second mode simultaneously if necessary.

More specifically, in the second mode of obstacle avoidance, as the front plate 100 of the discharge chute 60 contacts an obstruction, such as a tree, the front plate 100 pivots rearward toward the second position. The connection between the front plate 100 and the rear plate 105 provided by the rear top plate 155 forces the rear plate 105 to also pivot such that the angle between the two plates 100, 105 remains substantially constant and the front top plate 150 and the rear top plate 155 remain in the same plane and orthogonal to the front and rear plates 100, 105. In the illustrated construction, the plates 100, 105 remain substantially parallel to one another. However, other angles between the plates 100, 105 could be employed if desired. As the obstruction passes the end of the rear plate 105, the biasing member 210 forces the discharge chute 60 back to the first position.

To operate the mower 10 as a mulching mower, the operator moves the discharge chute control 65 to a mulch setting. The control 65 moves the front plate 100 and the rear plate 105 to the second position such that the two plates 100, 105 are substantially parallel to one another and the front plate 100 substantially covers the hinge plate aperture 85. With the hinge plate aperture 85 covered, the clippings remain within the deck 15 and are repeatably cut by the rotating blades 31.

Figure 5:
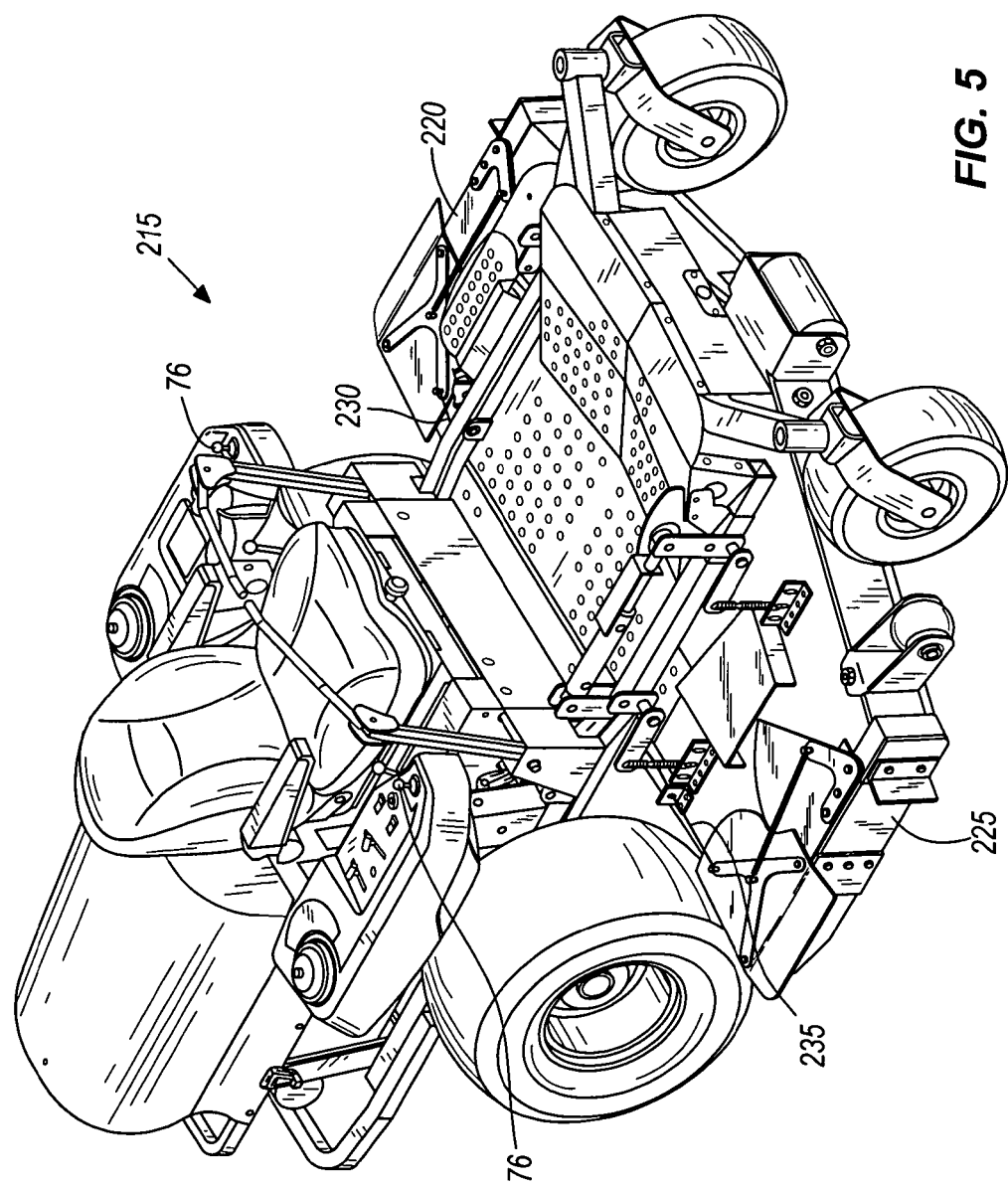
FIG. 5 is a perspective view of a lawn mower including two side discharge chutes.

FIG. 5 illustrates another construction of a lawn mower 215 that includes a left-hand discharge chute 220 and a right-hand discharge chute 225. The lawn mower 215 may also include two or more rotating blades 31 that each direct clippings toward one of the discharge chutes 220, 225. It should also be noted that the direction of rotation of the blades 31 can be varied to direct clippings in the desired direction. For example, the cutting blades 31 may rotate in a clockwise direction to direct clippings out the right-hand discharge chute 225, and rotate in a counterclockwise direction to direct the clippings out the left-hand discharge chute 220. The direction of rotation of the cutting blades 31 would be selected by the user to direct the clippings as desired. In addition, if both discharge chutes 220, 225 were opened, the cutting blades 31 could be made to rotate in different directions such that one or more blades 31 direct clippings to the right-hand discharge chute 225, and the remaining blades 31 direct clippings to the left-hand discharge chute 220. The left-hand discharge chute 220 is controlled by a left-hand discharge chute control 230 that is much like the discharge chute control 65 described with regard to FIGS. 1–4. Similarly, the right-hand discharge chute 225 is controlled by a right-hand discharge chute control 235 that is similar to the discharge chute control 65 described with regard to FIGS. 1–4. The use of individual discharge chute controls 230, 235, as shown in FIG. 5, allows either chute 220, 225 to be moved to any position, regardless of the position of the other chute 220, 225. The controls 220, 225 illustrated in FIG. 5 are different than the control 65 of FIGS. 1–4 in that the controls 220, 225 employ joysticks 76 to direct a powered actuator (e.g., motor, hydraulic actuator, pneumatic actuator, etc.). The powered actuator in turn moves the cable in a manner similar to the lever 75.

Alternatively, a single discharge chute control could be employed to move both discharge chutes 220, 225 to the same position (i.e., both closed or both opened), or to move both discharge chutes 220, 225 to opposite positions (i.e., one opened the other closed). The operation and construction of each discharge chute 220, 225, no matter the control employed, is substantially the same as was described with regard to the discharge chute 60 of FIGS. 1–4.

Thus, the invention provides, among other things, a new and useful discharge chute for a lawn mower. The constructions of the discharge chute and the methods of assembling the discharge chute described above and illustrated in the figures are presented by way of example only and are not intended as a limitation upon the concepts and principles of the invention. Various features and advantages of the invention are set forth in the following claims.

What is claimed is:

1. A lawn mower comprising:
   a cutting blade rotatable about a blade axis to produce clippings;
   a mower deck including a side opening positioned to allow for the discharge of the clippings;
   a discharge chute coupled to the mower deck adjacent the side opening, the discharge chute including:
   a first plate at least partially defining the front of the discharge chute;
   a second plate at least partially defining the rear of the discharge chute, the second plate spaced apart from and arranged at a first angle relative to the first plate; and
   a top plate coupled to and arranged at a second angle relative to the plate,
   wherein the first plate, the second plate, and the top plate, are movable to move the discharge chute between a first position and a second position such that the first angle and the second angle remain substantially constant; and
   further comprised of a biasing member coupled to the discharge chute, the biasing member biasing the discharge chute toward the first position.

2. The lawn mower of claim 1, further comprising a bracket positioned adjacent the side opening and movable about an axis that is substantially perpendicular to the blade axis.

3. The lawn mower of claim 1, wherein the second position is a mulching position and the first plate substantially covers the side opening.

4. The lawn mower of claim 1, further comprising a second discharge opening and a second discharge chute disposed adjacent the second discharge opening.

5. The lawn mower of claim 1, further comprising an operator position and a chute control operable to move the front plate from the first position to the second position, the chute control accessible from the operator position.

6. A lawn mower comprising:
a cutting blade rotatable about a blade axis to produce clippings;
a mower deck including a side opening positioned to allow for the discharge of the clippings; and
a discharge chute coupled to the mower deck adjacent the side opening, the discharge chute including:
a first plate at least partially defining the front of the discharge chute;
a second plate at least partially defining the rear of the discharge chute, the second plate spaced apart from and arranged at a first angle relative to the first plate; and
a top plate coupled to and arranged at a second angle relative to the first plate,
wherein the first plate, the second plate, and the top plate, are movable to move the discharge chute between a first position and a second position such that the first angle and the second angle remain substantially constant;
wherein the first plate is pivotally coupled to the bracket at a front pivot axis and the second plate is pivotally coupled to the bracket at a rear pivot axis, the rear pivot axis spaced a distance from and substantially parallel to the front pivot axis.

7. A lawn mower comprising:
a cutting blade rotatable about a blade axis to produce clippings;
a mower deck including a side opening positioned to allow for the discharge of the clippings; and
a discharge chute coupled to the mower deck adjacent the side opening, the discharge chute including:
a first plate at least partially defining the front of the discharge chute;
a second plate at least partially defining the rear of the discharge chute, the second plate spaced apart from and arranged at a first angle relative to the first plate; and
a top plate coupled to and arranged at a second angle relative to the first plate,
wherein the first plate, the second plate, and the top plate, are movable to move the discharge chute between a first position and a second position such that the first angle and the second angle remain substantially constant;
wherein the first angle is about zero degrees such that the first plate is substantially parallel to the second plate.

8. The lawn mower of claim 7, wherein the second angle is about ninety degrees such that the top plate is substantially perpendicular to the first plate and the second plate.

9. A lawn mower comprising:
a cutting blade rotatable about a blade axis to produce clippings;
a mower deck including a side opening positioned to allow for the discharge of the clippings; and
a discharge chute coupled to the mower deck adjacent the side opening, the discharge chute including:
a first plate at least partially defining the front of the discharge chute;
a second plate at least partially defining the rear of the discharge chute, the second plate spaced apart from and arranged at a first angle relative to the first plate; and
a top plate coupled to and arranged at a second angle relative to the first plate,
wherein the first plate, the second plate, and the top plate, are movable to move the discharge chute between a first position and a second position such that the first angle and the second angle remain substantially constant;
wherein the top plate is pivotally coupled to the first plate and the second plate, the discharge chute further comprising a sliding plate fixedly coupled to the first plate such that the sliding plate is substantially parallel to the top plate.

10. The lawn mower of claim 9, wherein the sliding plate is arranged to slide beneath the top plate as the first plate and the second plate move from the first position to the second position.

11. The lawn mower of claim 9, wherein the top plate and the sliding plate are rubber.

12. A lawn mower movable along a mower path to produce clippings, the lawn mower comprising:
a blade supported for rotation about a blade axis;
a mower deck including a discharge opening and positioned to substantially cover the blade;
a bracket coupled to the mower deck adjacent the discharge opening, the bracket rotatable about a bracket axis that is substantially parallel to the mower path;
a front plate pivotably mounted to the bracket;
a rear plate pivotably mounted to the bracket and disposed at an angle relative to the front plate; and
a top plate coupled to at least one of the front plate and the rear plate, the front plate, the rear plate, and the top plate movable between a first position wherein clippings are discharged from the mower deck and the angle has a first value, and a second position wherein clippings are substantially retained within the mower deck and the angle is a second value that is substantially the same as the first values;
further comprising a biasing member coupled to the front plate, the biasing member biasing the front plate to the first position.

13. The lawn mower of claim 12, wherein the second position is a mulch position and the front plate substantially covers the discharge opening.

14. The lawn mower of claim 12, further comprising an operator position and a chute control operable to move the front plate from the first position to the second position, the chute control accessible from the operator position.

15. The lawn mower of claim 12, further comprising a second blade disposed beneath the mower deck.

16. The lawn mower of claim 15, wherein the mower deck includes a second discharge opening opposite the discharge opening, the lawn mower further comprising:
a second bracket coupled to the mower deck adjacent the second discharge opening, the second bracket rotatable about a second bracket axis that is substantially parallel to the mower path;
a second front plate pivotably mounted to the second bracket and movable between a first position and a second position;
a second rear plate pivotably mounted to the second bracket; and
a second top plate coupled to at least one of the second front plate and the second rear plate.

17. The lawn mower of claim 16, further comprising an operator position and a chute control operable to move the front plate and the second front plate from the first position to the second position, the chute control accessible from the operator position.

18. A lawn mower movable along a mower path to produce clippings, the lawn mower comprising:
a blade supported for rotation about a blade axis;
a mower deck including a discharge opening and positioned to substantially cover the blade;
a bracket coupled to the mower deck adjacent the discharge opening, the bracket rotatable about a bracket axis that is substantially parallel to the mower path;
a front plate pivotably mounted to the bracket;
a rear plate pivotably mounted to the bracket and disposed at an angle relative to the front plate; and
a top plate coupled to at least one of the front plate and the rear plate, the front plate, the rear plate, and the top plate movable between a first position wherein clippings are discharged from the mower deck and the angle has a first value, and a second position wherein clippings are substantially retained within the mower deck and the angle is a second value that is substantially the same as the first value;
wherein the angle is about zero degrees such that the front plate is substantially parallel to the rear plate.

19. A lawn mower movable along a mower path to produce clippings, the lawn mower comprising:
a blade supported for rotation about a blade axis;
a mower deck including a discharge opening and positioned to substantially cover the blade;
a bracket coupled to the mower deck adjacent the discharge opening, the bracket rotatable about a bracket axis that is substantially parallel to the mower path,
a front plate pivotably mounted to the bracket;
a rear plate pivotably mounted to the bracket and disposed at an angle relative to the front plate; and
a top plate coupled to at least one of the front plate and the rear plate, the front plate, the rear plate, and the top plate movable between a first position wherein clippings are discharged from the mower deck and the angle has a first value, and a second position wherein clippings are substantially retained within the mower deck and the angle is a second value that is substantially the same as the first value;
wherein the top plate is pivotally coupled to the front plate and the rear plate, and wherein a sliding plate is fixedly coupled to the front plate such that the sliding plate is substantially parallel to the top plate.

20. The lawn mower of claim 19, wherein the sliding plate is arranged to slide beneath the top plate as the front plate and the rear plate move from the first position to the second position.

21. The lawn mower of claim 19, wherein the top plate and the sliding plate are rubber.

22. A discharge chute assembly for a lawn mower having a deck with a rotating cutting blade under the deck for cutting vegetation, the deck including a discharge opening for the discharge of cut vegetation from under the deck, the discharge chute assembly comprising:
a hinge bracket hingedly interconnected to the mower deck and defining a chute opening aligned with the discharge opening;
a front plate pivotally attached to the front of the hinge bracket;
a rear plate pivotally attached to the rear of the hinge bracket;
a front top plate interconnected with the front plate and positioned above the hinge bracket and chute opening, the front top plate including a spring anchor point;
a rear top plate interconnected with the rear plate and positioned above the hinge bracket and chute opening;
a spring/cable bracket disposed over the rear top plate and pivotally interconnected with the front and rear plates; and
a spring interconnected between the spring/cable bracket and the spring anchor point to bias the chute assembly to a discharge position;
wherein the discharge chute assembly is movable between the discharge position in which the front plate, rear plate, front top plate, and rear top plate define a discharge chute channeling cut vegetation from under the deck, and a mulching position in which the front plate is pivoted across the chute opening to cause vegetation to remain under the mower deck and be mulched by the rotating cutting blade.

23. The discharge chute of claim 22, wherein the front top plate and the rear top plate are substantially parallel to one another throughout movement between the discharge position and the mulching position.

24. The discharge chute of claim 22, wherein the front top plate is arranged to slide beneath the rear top plate as the front plate and the rear plate move from the discharge position to the mulching position.

25. The discharge chute of claim 22, wherein the front top plate and the rear top plate are rubber.

26. A method of moving a discharge chute for a lawn mower from a discharge position to a mulch position, the method comprising:
arranging a front plate, a rear plate, and a top plate around a discharge opening to at least partially define a discharge chute;
positioning a chute control adjacent an operator position;
actuating the chute control;
moving the front plate into covering relationship with the discharge opening in response to movement of the chute control; and
maintaining an angular relationship between the front plate, the rear plate, and the top plate during movement of the front plate;
further comprising sliding the second top plate beneath the top plate in response to movement of the first plate.

27. The method of claim 26, further comprising positioning a second top plate adjacent the top plate.

28. A discharge chute for a lawn mower having a mower deck and a mower deck opening, the discharge chute movable between a discharge position and a mulch position and comprising:
a pivot plate defining an opening aligned with the mower deck opening and pivotable with respect to the deck about a first axis;
a front plate pivotable with respect to the pivot plate about a second axis;
a rear plate pivotable with respect to the pivot plate about a third axis; and
at least one top plate defining a top plane and movable within said top plane when the discharge chute moves between the discharge position and the mulch position; and
wherein the rear plate is substantially parallel to the front plate and the rear plate remains substantially parallel to the front plate as the discharge chute moves between the discharge position and the mulch position.

29. The discharge chute of claim 28, wherein the first axis is substantially horizontal and the second axis is orthogonal to the first axis and is substantially parallel to the third axis.

30. The discharge chute of claim 28, wherein the top plate is substantially orthogonal to the first plate and remains substantially orthogonal to the first plate as the discharge chute moves between the discharge position and the mulch position.

31. The discharge chute of claim 28, further comprising a second top plate movable in the top plane when the discharge chute moves between the discharge position and the mulch position.

32. The discharge chute of claim 28, wherein the first top plate moves beneath the second top plate as the discharge chute moves between the discharge position and the mulch position.

33. The discharge chute of claim 31, wherein the first top plate and the second top plate are rubber.

* * * * *